United States Patent [19]

Powell

[11] Patent Number: 4,835,733

[45] Date of Patent: May 30, 1989

[54] PROGRAMMABLE ACCESS MEMORY

[75] Inventor: Jon Powell, Lewisville, Tex.

[73] Assignee: SGS-Thomson Microelectronics, Inc., Carrollton, Tex.

[21] Appl. No.: 781,584

[22] Filed: Sep. 30, 1985

[51] Int. Cl.⁴ .................. G06F 12/00; G06F 12/06
[52] U.S. Cl. ........................... 364/900; 364/927.8;
364/958.5; 364/965.2; 364/970; 364/970.4;
365/231
[58] Field of Search ... 364/200 MS File, 900 MS File;
365/230, 231

[56] References Cited

U.S. PATENT DOCUMENTS

| 3,710,348 | 6/1973 | Craft | 364/900 |
|---|---|---|---|
| 3,914,747 | 10/1975 | Barnes et al. | 364/200 |
| 4,037,205 | 7/1977 | Edelberg et al. | 364/900 |
| 4,096,565 | 6/1978 | Ruckdeschel et al. | 364/200 |
| 4,663,742 | 5/1987 | Anderson et al. | 365/189 |

Primary Examiner—Gareth D. Shaw
Assistant Examiner—Christina M. Eakman
Attorney, Agent, or Firm—Roland Plottel

[57] ABSTRACT

An integrated circuit memory includes processing capability on the same chip, on one or both of an address path and data path between a set of access registers and a memory array so that an address can be generated, checked or manipulated and/or data can be manipulated or compared with a reference pattern of data.

21 Claims, 5 Drawing Sheets

PROGRAMMABLE ACCESS MEMORY

DESCRIPTION

TECHNICAL FIELD

The field of the invention is that of integrated circuit memories. In particular, the field is that of memories having processing capability incorporated within the memory unit.

BACKGROUND ART

It is known to have overhead circuitry on random access memories to accomplish decoding functions, and, in the case of dynamic random access memories, to provide for automatic refreshing cycles that are invisible to the system programmer. Prior art memories typically have provision for direct access from the input terminals to the decoding logic for the memory cell array, in order to reduce the memory cycle time to a minimum.

SUMMARY OF THE INVENTION

The invention relates to an intelligent memory that incorporates a controlling unit including an ALU (Arithmetic-and-Logic Unit) on the same chip as the memory cell array.

A feature of the invention is an architecture that provides a data path for passing addresses and data from a set of access registers through at least one processing unit to a memory array, the path being controlled by a finite-state machine that does not itself process data, and the data path having a first branch for addresses and a second branch for the data stored in the cells.

Another feature of the invention is the use of indirect access in which all references to and from the cell array must be made through a set of control registers.

Another feature of the invention is the provision of an array of control registers that includes a data register for storing the memory data to be written into or read out from the memory and an address register carrying the address associated with the currently available data.

Yet another feature of the invention is the use of an address calculation unit to provide automatic indexing of the address.

Yet another feature of the invention is the provision of registers to store the upper and lower boundaries of an address range, thereby making automatic bound checking for memory arrays possible.

Yet another feature of the invention is a memory control sequence that provides for a FIFO memory unit constructed out of the random access memory.

Yet another feature of the invention is the programmable conversion of the random access memory to a LIFO (stack) memory unit.

Yet another feature of the invention is the provision for automatic searching within the memory array, thus providing a content-addressable memory.

Yet another feature of the invention is the provision of an automatic sequence of modification of data stored within the memory according to a prescribed rule.

Yet another feature of the invention is the provision of additional address space greater than is available to a system CPU by means of a hardware assisted data abstraction involving indirect addressing.

BEST MODE OF CARRYING OUT THE INVENTION

Figure 1:
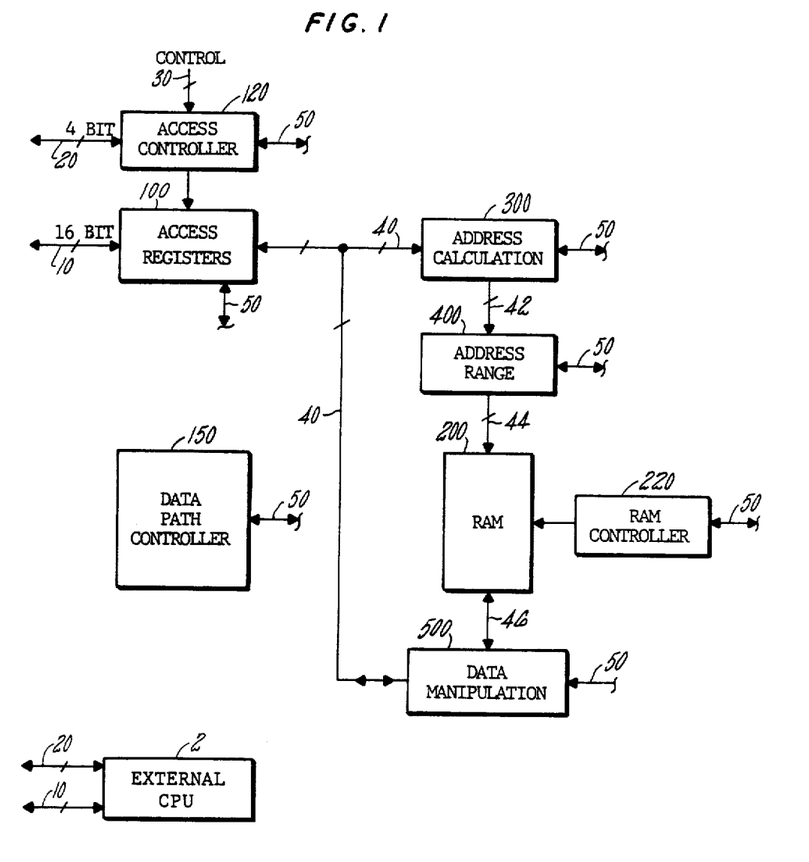
FIG. 1 illustrates an overall block diagram of a memory contructed according to the invention.

Referring now to FIG. 1, there is shown an overall view of a memory system (referred to as a Programmable Access Memory, or PAM) having a random access memory (RAM) 200, that may contain either static or dynamic cells and associated decoders, an access register array 100 through which data and addresses pass, a data path controller 150 for controlling the transfer of data between register 100, RAM 200 and associated circuitry including address calculation unit 300, address range unit 400 and data manipulation unit 500. In most of the many modes of operation of the system, addresses and data will not simply travel into and out from RAM 200, as in a standard RAM, but will be checked or manipulated in one of the associated units.

It is convenient to consider first the three sets of input/output lines: a 16-bit data/address bus 10 accesses a set of access registers 100 to be described later; a 4-bit bus 20 is used to specify one or more of 16 access registers within unit 100; and a set of external control lines 30 is used to receive and acknowledge external control signals. Bus 20 enters access controller 120, which is a simple, self-timed controller that responds to external control signals and handles reading and writing to and from access registers 100 and the outside world. Control signals for enable, acknowledge, read, write and other standard functions enter bus 30 and cause controller 120 to latch input data; release output data; or pass a control signal on to other units.

Control of data paths within the memory system is done by data path controller 150, which, as will be described later, is a simplified finite state machine that has less complexity than a standard central processing unit. The operating mode of the system is determined and changed from time to time by transfer of the contents of a MODE register within access register unit 100 into controller 150. The contents of the register specify, among other things, the starting point of a subroutine in microcode memory within the controller unit. The control of the data path and the transfer of the MODE register contents and other information to and from the different units along the several buses is accomplished under control of unit 150 by means of a set of control lines that are generically indicated by the numeral 50, some portions of which control lines enter all the logical units.

Data, addresses, and some control signals pass along bus 40 into address calculation module 300 and then to the other units. A single bus could be used, but at the cost of data throughput.

A standard memory cell array unit, 200, including address decoders and controlled by standard RAM controller 220 (controller 220 is a standard unit well-known to those skilled in the art such as the one disclosed in Foss and Harland "Peripheral Circuits for One Transistor Cell MOS RAMs") is the basic unit that is effectively customized by the other units to simulate a number of specialized memory units.

Three specialized units are used fo effect some of the special functions of the memory system. Address calculation unit 300 includes a simplified ALU having addition, subtraction and comparison functions to calculate an address and is used in various modes of the invention such as the FIFO, LIFO and indirect addressing modes. Address range unit 400 is used to check if the address on bus 42, whether calculated by unit 300, or coming from an address access register within unit 100, lies within a specified boundary range. This unit may conveniently be used to prevent reading or writing to a memory address outside that specified range. One use is to separate data from instructions within RAM 200 and to generate an error signal if the external central processing unit of the overall system has accidently attempted to write into an instruction storage cell. Another function is to do real-time array bounds checking. The last unit, data manipulation unit 500, is used, as will be described below, to perform certain selected processing functions on the data within RAM 200. As one example, the invention can be used in an automatic search mode in which RAM 200 is searched until a particular pattern of data is found.

Although the invention is intended to provide certain specialized functions requiring intelligence associated with the memory unit, it is convenient for purposes of explanation to start with an ordinary memory read cycle. In that case, the operating mode has previously been specified by sending a 4-bit address along bus 20, in response to which a mode register within unit 100 has been connected to bus 10. Next, a 16-bit data address is placed on bus 10 by the system CPU and is loaded into the mode register. This process is controlled by access controller 120. Alternatively, mode addresses may be stored in unit 100. Control lines contained within control network 50 then stimulate the data path controller 150 to access the contents of the mode register, which cause the microcode within unit 150 to branch to a subroutine that initiates the sequence that follows.

The standard read function is initiated by a system CPU or other device sending the 4-bit address of the memory address register (MAR) within unit 100 to controller 120 and also by placing the 16-bit address of the data to be read on bus 10. Unit 100, under control of controller 120, opens a path between bus 10 and the memory address register and writes the address into that register. Next, data path controller 150 transmits the address to Address Calculation Unit 300 that, in this case merely passes it through to Address Range Unit 400 that checks that the address lies within an allowed range. Unit 400 then passes the address to RAM unit 200 which, in turn, handles the standard decoding function to access that particular cell memory address. The contents of the cells specified by that address are placed on bus 46; transmitted to Data Manipulation Unit 500; and then written into the memory data register (MDR) within unit 100. Access controller 120 then sends a control signal along bus 30 to the CPU indicating that the data is available in the address register and, in response to a read signal from the CPU, places the contents of the memory data register on bus 10.

It will be evident to those skilled in the art that this seequence of steps is considerably more lengthy than the standard memory read sequence in a non-intelligent memory. In particular, there has been the extra step of sending the 4-bit address of the MAR to access controller 120, in addition to the 16-bit memory address on bus 10. It is expected that this memory unit will not often be used in the standard read and write modes, though it may be convenient for system design to use the memory in this way from time to time. Most often, the total time for an operation to be accomplished will be substantially reduced by permitting the memory to do some bookkeeping and controlling within itself, without access along the system bus to the CPU. These specialized memory functions will next be described.

Operating Modes

1. Protected Access Mode

Two of the registers within access register unit 100 contain START and STOP registers defining an area within the address space of RAM 200. No memory accesses are allowed to addresses outside these boundaries. This feature may be used for automatic checking that the programmer is not attempting to read or write data that is outside the range of a memory array.

2. Sequential Access Mode (Circular Buffer)

A set of registers START and STOP define the boundaries of an area within the address space of RAM 200 that is used for a FIFO (First In First Out) buffer that is implemented as a circular buffer. Additional registers IN PTR and OUT PTR point to the next write and read addresses, respectively. Additional registers IN INCR and OUT INCR define autoincrement amounts for writes and reads. This last feature is useful in data base applications where a record will consist of several words. Data is written into the data register in unit 100 and automatically transferred to the next available space within the buffer, indicated by the IN PTR register.

Simple logical comparisons within Address Calculation Unit 300 provide standard tests that prevent data from being written into a full buffer or data being read out from an empty buffer. Appropriate error flags are set within the status register within unit 100.

The FIFO mode is an example of a hardware assisted data abstraction, which is a hardware device or system that implements a data process in a manner such that the hardware configuration is invisible to the user.

Note that if the bus used in the overall system permits automatic read operations, which is standard in system operation, this feature will permit simple fast communications between two devices sharing the external system bus, such as direct memory access from an I/O device to the RAM without going through a system CPU.

3. LIFO Mode (Stack Operation)

Registers within unit 100 are used as the registers required to implement a stack; namely a stack pointer, a starting address and an offset register. The stack may be implemented by doing the standard PUSH and POP functions, using Address Calculation Unit 300 to automatically increment and decrement the stack pointer as required.

A stack offset operation may be used to store data in the memory data register in the RAM address indicated by the base register plus the offset register. Similarly, data is read out of the RAM address corresponding to the base plus offset sum.

4. Functional Access

On any memory accesses, either before or after the read operation, modification of the data may be performed in accordance with a prescribed recipe. As one example, a pattern of bits may be stored in a register (function) within access register unit 100. Data from the RAM could be logically processed as by NAND function, OR function, etc. with either input data or with a stored pattern. Also, the data could be subjected to more complex operations such as addition with a constant, a variable, or preceding data.

5. Pattern Fill

This is a special case of the preceding function access. An address range within RAM 200 is filled with a pattern and function specified after which a completion signal is transmitted by access controller 120. The pattern may be constant or may vary within the address range.

6. Fast Data Transfer

Copy the contents of one address range within RAM 200 to another address range within RAM 200. Registers store the start and length of the source and the start of the destination. This is sometimes called 'bit blit' or block transfer.

7. Pattern Find

Locate the occurrence of a 16-bit pattern in some memory address range. This uses the same registers and logic as the write operation of the functional access, mode number 4. This operating mode is useful in data base manipulation.

8. Pattern Find And Fill

In this mode, an area of RAM 200 is modified according to a prescribed function until a certain pattern is reached.

An important feature of the architecture of the PAM is the "data path", by which term is meant the sets of buses 40, 42, 44 and 40, 46 and the logic modules located between the buses that provide separate paths for addresses (which are regarded for purposes of this application as another form of data) and referred to as address data and the data that is stored within the memory array (memory data). If the functions described above, were to be performed by a programmed single-chip computer, the address would pass from an input register to the CPU and then to the memory and each of the functions of units 300, 400 and 500 would require at least one transfer from memory to the CPU and back again. In a PAM, the "intelligence" is in the Data Path Controller, which does not handle data or addresses. All comparisons, additions or other logical operations are done in units that are located in the data path and external to the Data Path Controller.

APPLICATION OF THE INVENTION

The following examples illustrate some of the system configurations and uses that may be employed using alernative embodiments of the invention.

1. Additional address space. An embodiment of the invention may be used as a memory extension where the host memory does not have enough address space to accommodate the needed area. In this case, the PAM mode is put into the standard access mode. The memory address register receives a 16-bit number that is an address within RAM 200. The memory data register receives the contents of that address. This is an ordinary read operation from the point of view of a PAM, but, to the host computer the only memory addresses taken up by the PAM are the 16 locations that are required by 4-bit bus 20. The 4-bits of bus 20 corresponds to the 16 access registers within unit 100. Thus, one or more PAMs may be attached to a host computer, each PAM having an address range of 64K but taking up only 16 words of the host physical memory. This is called 'Virtual Memory' or 'Indirect Memory'.

This use of the PAM as an address extension could be used in a hardware assisted data abstraction, which is a term to refer to any software data structure which is enhanced by special purpose hardware.

To use the PAM as a FIFO, the system user would:
(1) Load the FIFO mode number into the mode register.
(2) Set up the START and STOP registers with the limits of the circular buffer that are to be used.
(3) Initialize the IN PTR and OUT PTR to the same number (ideally 0). This makes the buffer be, initially, empty.
(4) Begin data transfer.
 a. A READ is done by:
  i. Check the status register to be sure the buffer is not empty.
  ii. Do a READ from the MDR.
 b. A WRITE is done by:
  i. Check the status register to be sure the buffer is not full.
  ii. Do a WRITE to the MDR.

The PAM will automatically store data to, or get data from, the correct address and coordinate with the MDR.

2. As a content addressable memory for searching.

A data base is stored as an array of records. The base may be searched by looking for a certain pattern in one entry in the record, or it may be searched by operating a test on one or more entries within the record and retrieving the record or records that satisfy the test.

As a first example, the data base could be a personnel record and a searching tag could be the employee's identification number. In that case, the pattern find operating mode number 7 may be used, with the pattern being the ID number that is stored within one of the registers 100. The contents of RAM unit 200 are searched until that pattern is found and the record associated with that pattern is output to the host computer. Note that since the search is being done by the PAM itself, the operation should run two or three times faster than if done by the microprocessor because once the procedure is set up, with the length of the record defined and the location within the record of the tag entry, the only operation of the host microprocessor is to pass to the PAM the ID number that is being searched for. The host microprocessor need not implement a bus access to bring in each record and then do a comparison, so that the saving of bus access time will result in a considerably faster operation.

Those skilled in the art will readily be able to implement many different systems employing this invention. A particular advantageous feature of the invention is the reduction in total operation time that results from simple searching and testing within the PAM and thus without involving the external bus.

An extension of the invention to larger data bases results in an additional advantage in that two or more PAMs may be operating simultaneously to search a large data base with the same test. Records that satisfy the test may be sent to the host CPM using standard interrupt procedures.

A further advantage of the invention for relatively small data bases or small areas of memory is that the same RAM unit 200 can be used in two or more modes sequentially. That is, the RAM may be used as a FIFO and also as a stack, the mode of operation being changed as required by a simple writing into the special purpose mode register of the correct control code.

A set of registers for unit 100 that will effect the preceding operations is given in Table I in which parentheses indicate different functions of a register in alternative modes. Those skilled in the art will readily be able to add additional registers to accomplish other specialized functions. The 12 registers in Table I may be supplemented by an additional four registers and still be addressed by the 4-bit bus 20. Those skilled in the art will readily be able to supplement the illustrative operating modes and register configurations to accomplish additional specialized functions.

Figure 2:
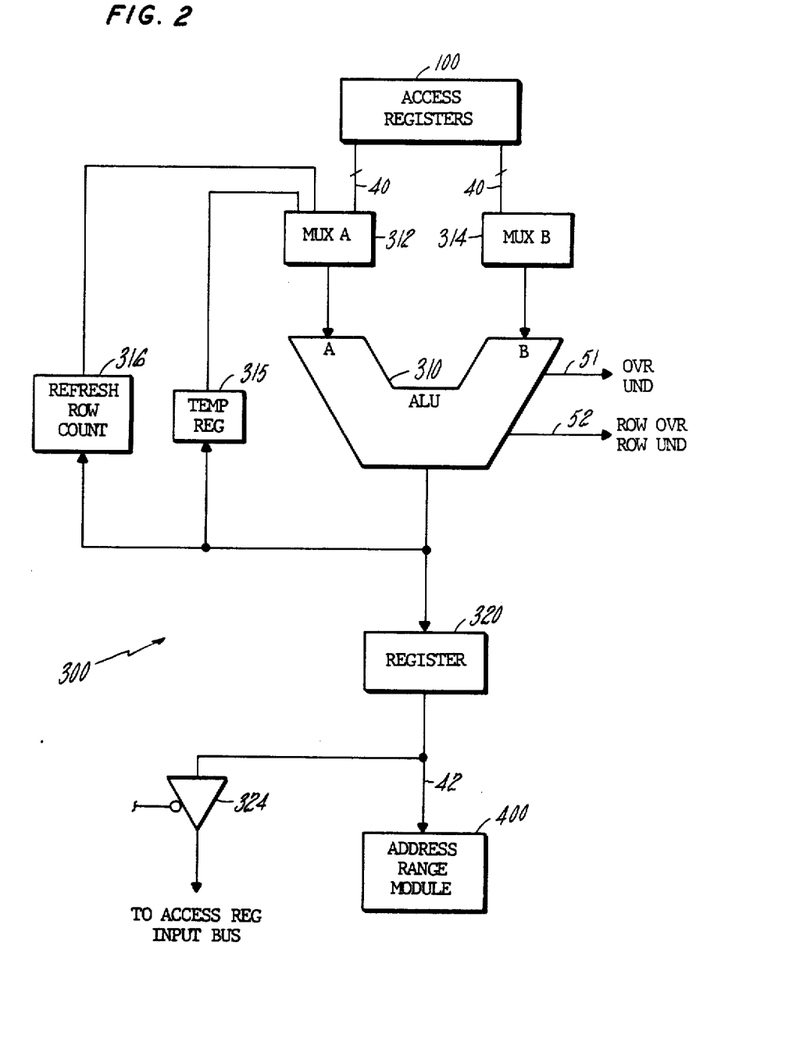
FIG. 2 illustrates the Address Calculation Module from FIG. 1.

Referring now to FIG. 2, there is shown a simple embodiment of address calculation module 300. Th heart of the module is ALU 310, a simple ALU having addition, subtraction and identity functions. Those skilled in the art will readily be able to devise many ALUs to perform these functions. ALU design is taught in Ward et al "Computation Structures", 1984. Two inputs, multiplexers 312 and 314, pass the contents of registers within unit 100 to the ALU 310. A temporary register 315 may be used for complicated address calculations. The function of the address calculation module, as noted above, is to calculate the current address for those operating modes that employ a pointer or other indirect addressing functions. A temporary register 320 latches the output of ALU 310 and the contents of register 320 are passed to address range module 400 along bus 42 or through gate 324 to access register 100, various registers of which will be updated as the result of the address calculation. The buses may be dedicated buses directly connecting one register or module with another. The Row Size input line to multiplexer 314 carries a constant input and is used to increment a row count register in the event that automatic refresh is desired. If RAM 200 is static, refresh is not necessary. This arrangement checks ALU overfow or underflow or (a special case) row number overfow or underflow. This tells when RAM address needs to be modified or could be invalid. Output signals are sent to controller 150 on lines 51 and 52 as part of control network 50.

Figure 3:
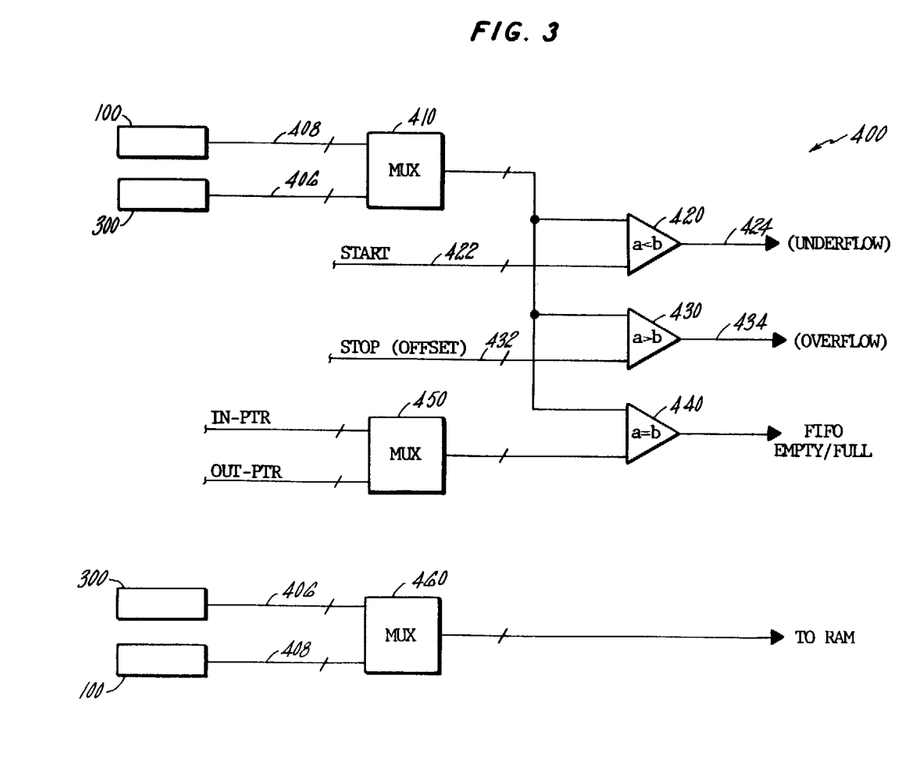
FIG. 3 illustrates the Address Range Module from FIG. 1.

Referring now to FIG. 3, there is shown an embodiment of an Address Range Module 400. The logical functions are performed on an address signal that may come either from the memory address register within unit 100 on bus 408 or from the output of address calculation module 300 on bus 406. One of these addresses is passed through multiplexer 410 and is input to three different 16-bit binary comparators 420, 430, or 440. Underflow and overflow signals on lines 424 and 434 respectively, are derived by comparison of the current address with a start address on line 422 or a stop (or offset) address on line 432. Both these addresses come from registers within access register unit 100. A third comparison is an empty/full indication for a FIFO buffer. This is produced by comparing the current address with either the IN PTR or OUT PTR, one of which is selected by multiplexer 450 for comparison. A third multiplexer 460 takes one of the addresses on lines 406 (from the MAR) or 408 (from Address Calculation Module 300) and passes it to RAM 200. The point of having a separate multiplexer, gated by data path controller 150, is that either post-increment or decrement or pre-increment or decrement may be accomplished, at the option of the system designer.

Figure 4:
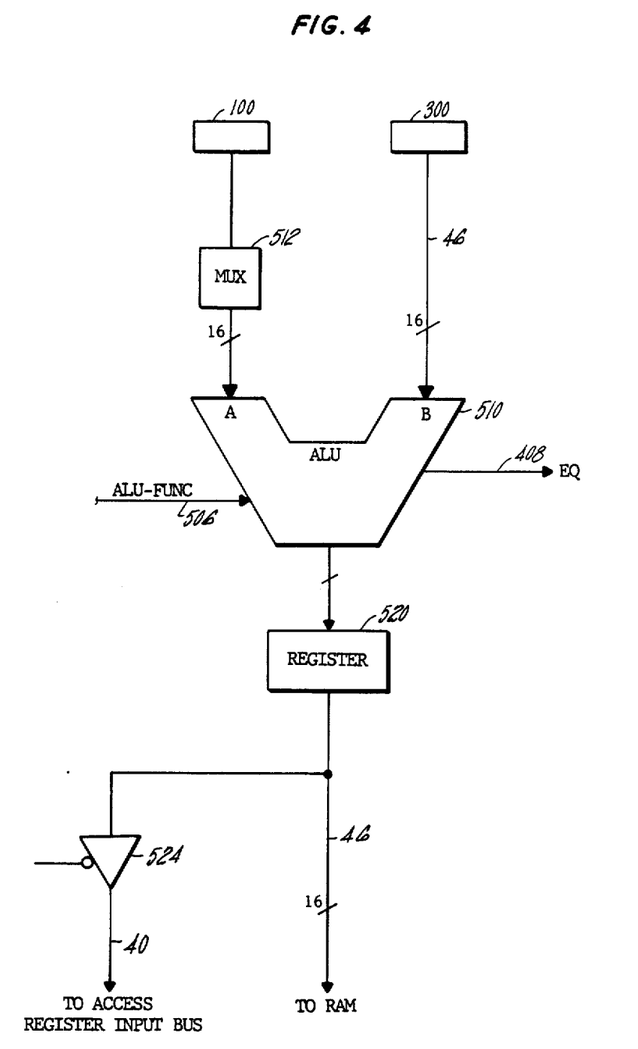
FIG. 4 illustrates the Data Manipulation Module from FIG. 1.

FIG. 4 illustrates an embodiment of data manipulation module 500, similar in outline to the contents of FIG. 2. A more complex ALU 510 having a full range of logical functions and also having arithmetic functions that include addition and subtraction accepts data along bus 46 from RAM 200 and also accepts either the contents of the memory data register or the pattern register from access register unit 100 through multiplexer 512. An input line 506 coming from the function register within unit 100 specifies which microcode subroutine within the ALU will be used to carry out the comparison or calculation. Temporary register 520 stores the result, which is returned to RAM 200 through bus 46 or to bus 40 through gate 524.

Figure 5:
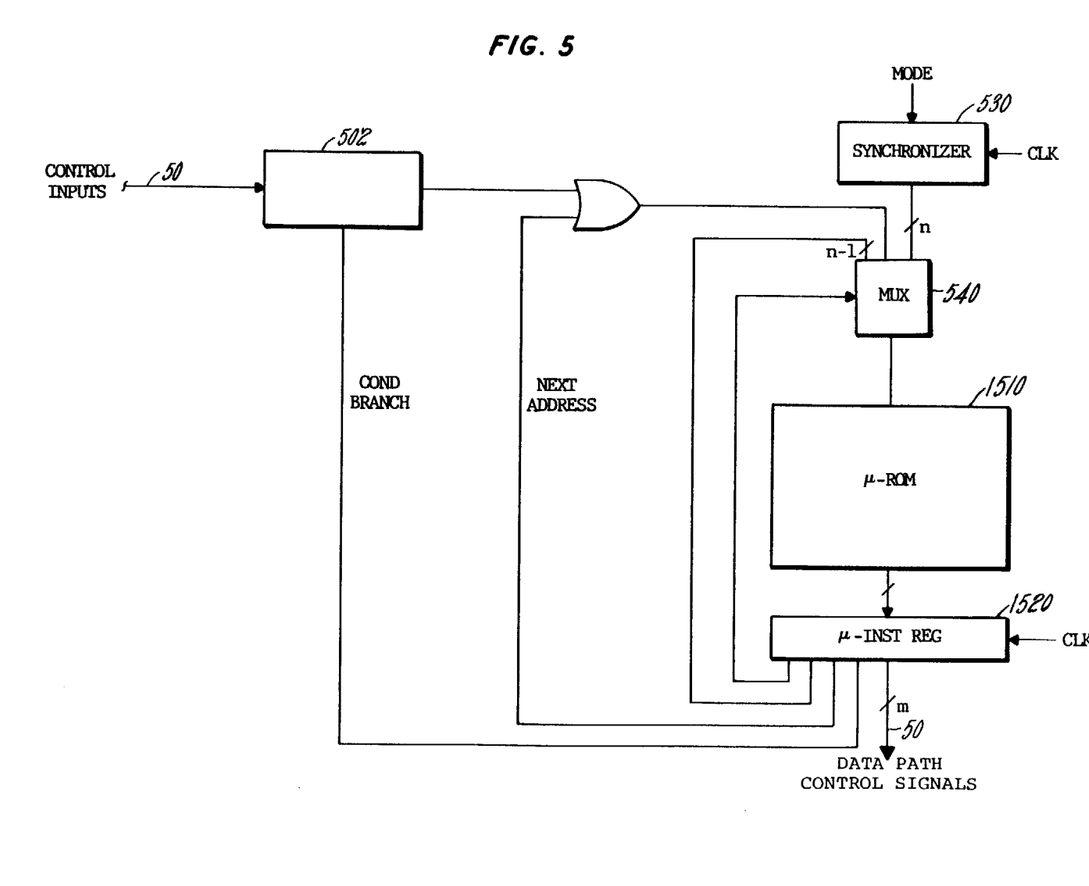
FIG. 5 illustrates the Data Path Controller from FIG. 1.

FIG. 5 illustrates a simplified diagram of data path controller 150. Control inputs from control line network 50 enter OR circuit 502 and pass into multiplexer 540 that also accepts a mode signal passing through synchronizer 530 that sychronizes the PAM controller with inputs from the host machine. This is necessary unless the PAM shares a clock with the host. The function of the mode value is to specify the starting point in the micro-RAM for the particular subroutine being executed. Micro-instruction register 1520 is a conventional unit, well-known to those skilled in the art, such as illustrated in Ward & Halstead "Computation Structures", 1983, MIT describes the '6032 machine'. Another example is the LSI-11 from Digital Equipment Corporation.

Those skilled in the art will readily be able to configure modified embodiments of the invention in which different microcode within the finite state machine of FIG. 5 modifies the general-purpose RAM to perform some particular application.

The figures have been drawn in order to provide the greatest clarity and are schematic in nature. For example, and without limitation, two or more controllers may be physically the same, except for the microcode that controls the operations. Similarly, the actual wiring path between units may be a common bus or a network of direct lines. RAM 200 may be either static or dynamic, bipolar or MOS.

Access registers 100 are meant to be understood as being general in nature. Any form of circuit that will hold data, including hard-wired voltage levels, EPROM circuits or pins maintained by an external circuit.

TABLE I

| Register | Function |
|---|---|
| MODE | Controls the operating mode |
| ALU FUNC | Specifies the data manipulation function in the Data Manipulation Module |
| STATUS | Contains error-signal bits and current operation status |
| START | Bottom of current active region |
| STOP | Top of current active region |
| CUR | Current address (also OFFSET) |
| SP | Stack Pointer (OUT PTR) |
| BASE | Base of stack register (IN PTR) |
| MDR | Memory Data Register (pattern to be searched for) |
| PATTERN | Modification pattern |
| IN INCR | Input increment |
| OUT INCR | Output increment |

*Parenthesis contain alternate functions in different modes of operation.

I claim:

1. An integrated circuit memory system on a single chip having at least one control unit and comprising:
   an array (200) of memory cells;
   decoder means responsive to a memory address for accessing at least one selected cell within said array (200);
   a set of access registers (100) for storing memory address data and memory data;
   a programmed access register controller means (120), responsive to external control signals (30), for controlling said set (100) of access registers; and
   a switchable network (50) of conductors connecting said array of memory cells with said set (100) of access registers;
   characterized in that said system further includes: at least one additional access register within said set (100) for storing at least one mode parameter and control parameters;
   address generation means (300) for generating a current memory address from an input reference signal (10) and being connected in an address data path (40, 42, 44) between said set (100) of access registers and said array (200) of memory cells to apply said current memory address to said decoder means, said address generation means including means for automatically incrementing a current address through a predetermined address range as successive data are stored, whereby a block of data in said predetermined address range may be stored without repeated address inputs; and
   data path controller means (150) coupled to and controlling, under stored program control (510, 520), said address generation means (300) and said switchable network (50) of conductors sequentially in a selected one of at least two different memory modes of operation specified by at least one mode parameter stored in said set of access registers, whereby said array (200) of memory cells may be logically structured, selectively, as at least two different types of memory.

2. A memory system according to claim 1, further characterized in that said address generation means generates a current address for storing data by operating on a START address and in which said current address is stored in a WRITE pointer register.

3. A memory system according to claim 2, in which said address generation means includes means for generating current addresses for a FIFO memory logical structure embodied in said memory system.

4. A memory system according to claim 2, in which said address generation means includes means for generating current addresses for a LIFO memory logical structure embodied in said memory system.

5. A memory system according to claim 1, in which said address generation means includes means for generating a series of read addresses within a first address range and a related series of write addresses within a second address range, in the course of a predetermined data transfer sequence controlled under stored program control by said controller means.

6. An integrated circuit memory system according to claim 1, in which
   said programmed access register controller (120) responds to a predetermined pattern of mode control signals to select a stored program (1510) within said data path controller means (150) for operating said address generation means (300) in a predetermined mode to calculate a current value for a memory address register (320); and
   said programmed access register controller (120) responds to external control signals to initiate selected sequences of instructions within said stored program (1510) in said data path controller means (150).

7. An integrated circuit memory system on a single chip having at least one control unit and comprising:
   an array (200) of memory cells;
   decoder means responsive to a memory address for accessing at least one selected cell within said array (200);
   a set of access registers (100) connected to at least one input/output terminal for storing memory address, memory data, mode and control parameters;
   a switchable network (50) of conductors connecting said array of memory cells with said set (100) of access registers;
   address logical operation means (400) connected between said set of access registers and said array of memory cells for performing, in response to an input signal, a logical operation on a current memory address, said address logical operation means (400) including means for comparing a current memory address with at least one reference address to determine if said current address is within a permitted range; and
   controller means for controlling said address logical operation means and said switchable network (50) of conductors in a selected one of at least two different memory modes of operation specified by at least one mode parameter stored in said set of access registers.

8. An integrated circuit memory system according to claim 7, in which said at least two memory modes include a stack mode in which said memory system functions as a LIFO stack having a stack pointer, starting address and data register within said set of access registers;
   in which a current value of said stack pointer is calculated by address calculation means within said address logical operation means under control of said controller means.

9. An integrated circuit memory system according to claim 7, in which said address logical operation means compares a current memory address with an upper reference address and with a lower reference address to determine if said current address is within a permitted range.

10. An integrated circuit memory system according to claim 7, in which said address logical operation means compares a current memory address with at least one reference address to determine if said current address is with a permitted range and, if said current address is greater than an upper bound of said address range, said address logical operation means substitutes for said current address a predetermined lower bound address, so that said memory system functions as a circular buffer.

11. An integrated circuit memory system according to claim 7, in which said address logical operation means compares a current memory address with at least one reference address to determine if said current address is within a permitted range and, if said current address is less than a lower bound of said address range, said address logical operation means substitutes for said current address a predetermined upper bound address, so that said memory system functions as a circular buffer.

12. An integrated circuit memory system comprising:
 a set (100) of access registers for storing memory addresses, memory data, and control parameters;
 a memory unit comprising an array (200) of memory cells having decoder means connected thereto and a RAM controller (220) coupled to and controlling said decoder and memory array;
 data path controller means (150) responsive to a set of parameters including mode control parameters (530), for controlling the operation of a first data path (40, 42, 44) for transmitting memory addresses from said set (100) of access registers to said decoder means of said memory unit (200) and a second data path (46, 40) for passing memory data to and from said set (100) of access registers and said memory unit (200), which data path controller means (150) contains stored program control means (1520) and means (50) for controlling said first and second data paths; and
 data manipulation means (500), located on said second data path (46, 40) and connected between said set (100) of access registers and said memory unit (200) and under stored program control (1510), for selectively manipulating, modifying, and identifying data passing between said set (100) of access registers and said memory unit (200), said data manipulation means altering data that is passing on said second data path (46, 40) between said set (100) of access registers and said memory unit (200) by performing a logical operation on said passing data.

13. An integrated circuit memory system according to claim 12, in which said data manipulation means alters data that is passing on said second data path between said set of access registers and said memory unit by performing a logical operation using said passing data and a predetermined set of modifying data.

14. An integrated circuit memory system according to claim 12, in which said data manipulation means operates to compare data on said second data path with a predetermined reference pattern of data.

15. An integrated circuit memory system according to claim 14, in which said data manipulation means operates to compare data passing out of said memory array on said second data path with a predetermined reference pattern of data and generates an identifying signal when a match is found with said reference pattern of data.

16. An integrated circuit memory system according to claim 15, further including an address generation means that steps a current memory address through a predetermined address range and in which said data path controller means reads out the contents of said current memory address to said data manipulation means until a match is found, whereby said memory system operates as a content-addressable memory.

17. An integrated circuit memory system according to claim 16, in which the contents of a predetermined range of memory addresses relative to said current address are read out in response to said identifying match signal, whereby a block of data of predetermined size may be located by a search on one element thereof.

18. An integrated circuit memory system according to claim 16, in which stored data are written into a predetermined range of memory addresses relative to said current address in response to said identifying match signal, whereby a block of data of predetermined size may be located and altered by a search on one element thereof.

19. An integrated circuit memory system according to claim 12, further including an address generation means (300) for stepping through a predetermined memory address range; in which said data path controller means operates on said first data path at selected addresses within said address range, whereby that data passing on said first data path is affected by said data manipulation means.

20. An integrated circuit memory system according to claim 19, in which said data manipulation means imposes stored data on said second data path during a read operation, so that said predetermined memory address range is filled with said stored data.

21. An integrated circuit memory system according to claim 20, in which said stored data is fixed.

* * * * *